United States Patent [19]

Haghiri-Tehrani

[11] Patent Number: 5,677,524
[45] Date of Patent: Oct. 14, 1997

[54] CHIP CARD AND A METHOD FOR PRODUCING IT

[75] Inventor: Yahya Haghiri-Tehrani, München, Germany

[73] Assignee: GAO Gesellschaft Fur Automation und Organisation mbH, Germany

[21] Appl. No.: 548,417

[22] Filed: Oct. 26, 1995

Related U.S. Application Data

[63] Continuation of Ser. No. 285,161, Aug. 3, 1994, abandoned, which is a continuation of Ser. No. 953,131, Sep. 29, 1992, abandoned.

[30] Foreign Application Priority Data

Oct. 1, 1991 [DE] Germany .............. 41 32 720.9

[51] Int. Cl.$^6$ ........................... G06K 19/06
[52] U.S. Cl. ........................... 235/492; 235/487
[58] Field of Search ........................... 235/487, 488, 235/492

[56] References Cited

U.S. PATENT DOCUMENTS

| | | | |
|---|---|---|---|
| 4,417,413 | 11/1983 | Hoppe et al. | 235/488 |
| 4,443,027 | 4/1984 | McNeely et al. | 235/488 |
| 4,457,798 | 7/1984 | Hoppe et al. | 235/492 |
| 4,511,796 | 4/1985 | Aigo | 156/248 |
| 4,792,843 | 12/1988 | Haghiri-Tehrani et al. | 235/492 |
| 4,896,027 | 1/1990 | Dresler | 283/83 |
| 5,149,945 | 9/1992 | Johnson et al. | 235/492 |
| 5,208,450 | 5/1993 | Uenishi et al. | 235/492 |
| 5,250,341 | 10/1993 | Kobayashi et al. | 428/137 |
| 5,410,136 | 4/1995 | McIntire et al. | 235/380 |

FOREIGN PATENT DOCUMENTS

| | | |
|---|---|---|
| 0 193 856 | 9/1986 | European Pat. Off. . |
| 0 521 778 | 1/1993 | European Pat. Off. . |
| 35 28 687 | 2/1987 | Germany . |
| 38 04 361 | 9/1988 | Germany . |
| 40 07 221 | 9/1991 | Germany . |
| 40 40 296 | 1/1992 | Germany . |
| 958946 | 5/1964 | United Kingdom . |

*Primary Examiner*—Donald T. Hajec
*Assistant Examiner*—Mark Tremblay
*Attorney, Agent, or Firm*—Bacon & Thomas

[57] ABSTRACT

On a check card having a mini chip card disposed detachably in an adapted recess the mini chip card is fixed in position by at least one fastening element provided on the card surface. After a first punching operation in which the mini chip card is still connected with the card body by bridges the fastening element is preferably placed on the card in such a way that it bridges the areas between the mini chip card and the card body. In a second punching operation the bridges are removed, after which the mini chip card is held in its original position on the card body only by the fastening element.

3 Claims, 2 Drawing Sheets

CHIP CARD AND A METHOD FOR PRODUCING IT

This application is a Continuation of application Ser. No. 08/285,161, filed Aug. 3, 1994, now abandoned which is a Continuation of application Ser. No. 07/953,131 filed Sep. 29, 1992, now abandoned.

BACKGROUND OF THE INVENTION

The present invention relates to a check card with a mini chip card disposed detachably in a window-like recess having a semiconductor chip and possibly corresponding contact surfaces, and to a method for producing such cards.

Check cards with an embedded semiconductor chip, so-called chip cards, are commonly known and are currently employed increasingly as credit cards, telephone cards, identity cards, etc. The structure and dimensions of chip cards and the form and position of the contact surfaces are fixed by international standards (ISO 7810 and ISO 7816/2).

Along with the chip cards defined in the stated standards, so-called mini chip cards have also been developed for special applications. They correspond to the standardized chip cards with respect to the chip and contact surfaces but their outer dimensions are reduced and the contour shape changed. To permit such mini chip cards to be used in the devices designed for customary standard chip cards there are furthermore proposals to provide check cards with window-like recesses in which the mini chip cards equipped with connecting elements can be fixed. Check cards with such reversibly removable chip elements can be found for example in U.S. Pat. No. 4,511,796 or German patent no. 38 04 361.

To permit check cards with integrated mini chip cards to be produced with sufficient precision but at reasonable expense, DE-OS 40 07 221 has furthermore proposed a method for punching the mini chip cards out of conventional standard chip cards such that they are connected with the standard card only by a few narrow bridges. The mini chip card is detached from the check card after the bridges are broken.

The fact that a mini chip card produced by the method described in DE-OS 40 07 221 cannot be fixed in the recess of the check card again once it has been removed from the check card has proved to be no problem in practice. This is presumably because the applications of the two card versions are clearly distinct from each other today. The standard check card as a carrier of the mini chip card is accordingly required predominantly in preparatory method steps, e.g. card personalization. The mini chip card alone is used primarily by the consumer, for example for cellular phones.

A disadvantage of the last-mentioned embodiment, however, has proved to be that the connecting bridges are the more difficult to break the more stable the total card structure is. Even if the bridges are very narrow it can thus be very troublesome to break out the mini chip card. The more the bridges resist breaking, the greater the danger of the mini chip card being exposed to excessive bending stresses in the process. This can result in the cards being damaged or even the chip destroyed. Furthermore, even if it is separated successfully from the check card the mini chip card will generally have remains of the connecting bridges in the area of these bridges that disturb the precision of the card edges. As has been shown, these remains of bridges obstruct or prevent insertion of the mini chip cards in the card holding means provided in devices, ultimately jeopardizing the usefulness of the mini chip card for the customer.

The invention is thus based on the problem of proposing a check card having an embedded mini chip card, and a method for producing it, whereby the mini chip card can be removed without trouble and also has sharp contours after removal.

BRIEF SUMMARY OF THE INVENTION

The invention is based on the idea that the connection between the mini chip card and the check card is not exposed to any great mechanical loads in practice. The fixation of the mini chip card need therefore not meet all the requirements normally met by a check card. If one takes account of this by fixing the mini chip card in easily detachable fashion this is of benefit for separating the two cards.

According to a preferred embodiment of the invention the card body and mini chip card are interconnected by a fastening element that fixes in position the mini chip card separated from the body by a punching operation. After a first punching operation in which the mini chip card is still connected with the body by bridges the fastening element is preferably placed on the card in such a way that it bridges the areas between the mini chip card and the rest of the body. In a second punching operation the bridges are removed, after which the mini chip card is held in its original position on the body only by the fastening element and can be easily detached from the body without any aids.

It thus proves to be particularly advantageous that a check card and an integrated mini chip card can be provided that are easy to produce and meet all requirements with respect to contact position, etc., but can also be easily separated from each other without any aids. The inventive principle also makes it possible to fix a mini chip card in the recess of the check card again after it has been removed. This can be desirable in exceptional cases.

Along with meeting the normal requirements, the inventive embodiment can also involve further advantages if the adhesive strip used for fixation is adhesive on both sides. In this case the check card can also be fastened to so-called advertising vehicles, for example information sheets, operating instructions, pamphlets, etc. Such measures are described for example in DE-OS 33 05 817, to which explicit reference is made in this connection.

Summing up it must be pointed out that a mini chip card completely punched out of the card body can still be held in the standard position if a fastening element sticking to one side of the card body is provided. The fixation is reversible, i.e. after the mini chip card is detached it can be refastened to the adhesive layer. Although it was already known to provide detachable chip elements, the inventive solution is surprising due to its particular simplicity and functionality. The expert already had the idea of fixing chip elements in the card body by means of adhesive films, as apparent from European patent no. 0 019 280. But this was stated in connection with a completely different problem. Also, greatest importance was attached to the chip element remaining fixed permanently in the card body and not being connected detachably with the check card.

BRIEF DESCRIPTION OF THE DRAWINGS

Further advantages can be found in the following description of embodiment examples.

DETAILED DESCRIPTION OF PREFERRED EMBODIMENTS

Figure 1:
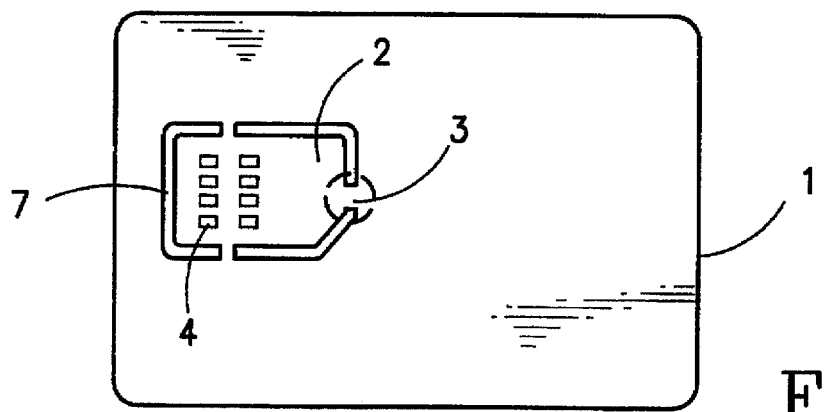
FIG. 1 shows a check card/mini chip card configuration punched by the conventional method.

FIG. 1 shows a check card 1 with prepunched mini chip card 2 which is connected with check card 1 by connecting bridges 3. Mini chip card 2 has a semiconductor chip )not shown) that is embedded in the interior of the card and connected with contact surfaces 4. The check card shown in FIG. 1 is known from the prior art, cf. DE-OS 40 07 221.

According to the method described in the abovementioned patent application, mini chip card 2 is firmly connected with the check card by connecting bridges 3 and to be used as a conventional standard chip card. If the mini chip card is to be used itself, one severs or breaks connecting bridges 3 after which the mini chip card can be removed from window-like recess 7 of check card 1. It has been shown that it may be rather difficult to break bridges 3 if the card material is resistant. Since this breaking is a rather uncontrolled process, remains of the bridges are either left on the edges of the mini chip card, or the bridges tear into the surface of the mini chip card thereby damaging it.

Figure 2:
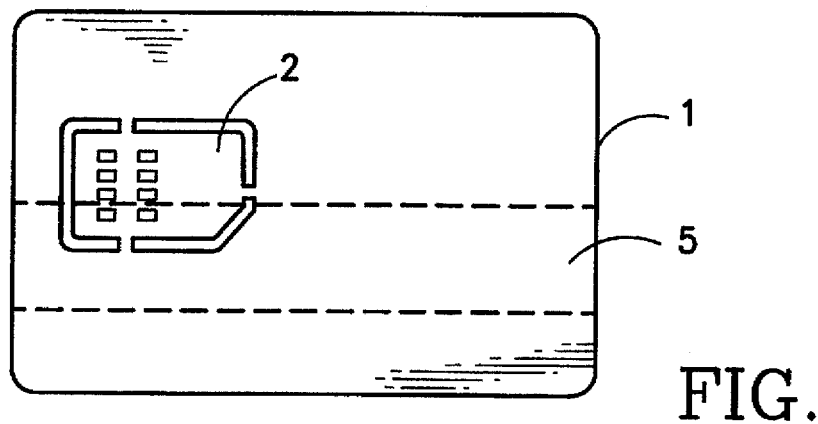
FIGS. 2, 3 show the inventive check card/mini chip card configuration in different method steps.
Figure 3:
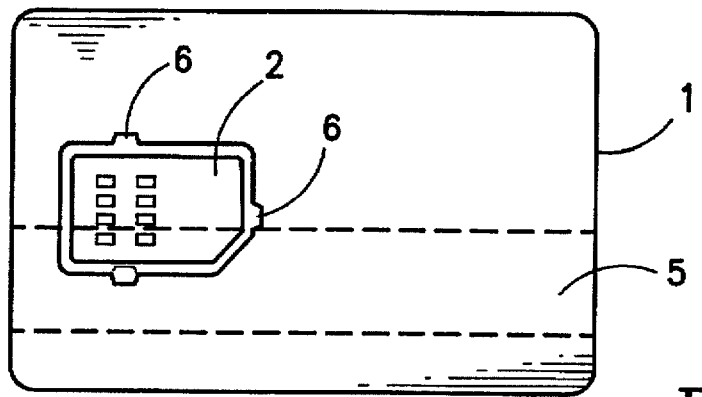

FIGS. 2 and 3 show the inventive check card/mini chip card configuration in various method steps.

Assuming the check card described in DE-OS 40 07 221, an adhesive film 5 is applied in a first method step to the back of the card so as to cover at least both a part of mini chip card 2 and a part of remaining check card 1. After adhesive film 5 is applied connecting bridges 3 are punched out of check card 1 in a further punching operation, as apparent from FIG. 3. Connecting bridges 3 are preferably punched such that the punching line adjacent the mini chip card runs exactly on the contour of the mini chip card. The mini chip card is thus completely separated from the check card and connected with the check card only by additional connecting element 5 (adhesive film).

FIGS. 2 and 3 show that the punching of bridges 3 has not altered the position of mini chip card 2. Adhesive film 5 still holds mini chip card 2 in recess 7. The position of contacts 4 thus still corresponds to the original contact configuration relative to the check card, thereby meeting the corresponding international standards for such cards.

Figure 4:
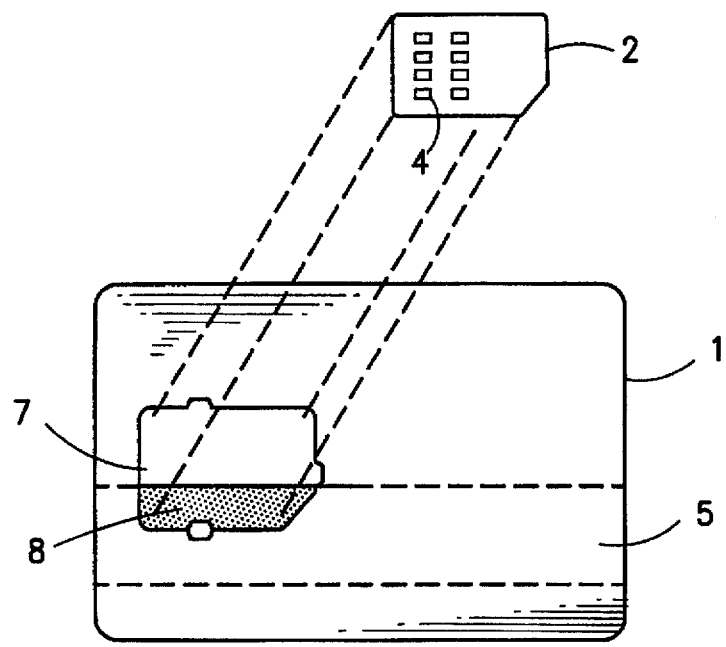
FIG. 4 shows the inventive check card/mini chip card configuration with the mini chip card detached from the check card.

Mini chip card 2 can be easily removed from the window of check card 1, as shown in FIG. 4, by detaching adhesive film 5 or bending it forward and then removing it. If mini chip card 2 is removed carefully, i.e. without damaging adhesive film 5, it can be reinserted in window 7 at a later time and fixed to shaded adhesive surface 8 again.

The expert will understand that the mini chip card can be fixed in a great variety of ways in keeping with the inventive principle. For example adhesive film 5 can cover the entire surface, or one or more short adhesive film strips can be used that cover only small parts of the mini chip card and the remaining check card. The only important thing in this connection is that the fastening element or adhesive film bridge the punching line over a certain length or at least at two or three points in such a way that the mini chip card remains sufficiently well fixed after connecting bridges 3 have been punched away.

Connecting bridges 3 can be punched out not only in the way shown in FIG. 3, where the bridges are removed by punching oval islands 6, but also by cutting through the card material linearly along the outer edge of the mini chip card. The latter embodiment has the additional advantage that if mini chip card 2 is reinserted in check card 1 it can be disposed relatively easily in the standard position through the remains of bridges left in window 7 of the check card.

As an alternative to applying the adhesive film, one can also provide an additional film on the card surface as the fastening element either during the card production or before the punching operation. The fastening element must not enter into a firm compound with the card body in either case; it may only cling and must be subsequently detachable. In the former case this is obtained by accordingly adjusting the laminating parameters and/or suitably selecting the materials. In the latter case special adhesives are used to connect the fastening element with the card body.

In both cases one obtains the advantage that the mini chip card can be punched out of the check card with only one punching or cutting operation. However the punching must not be done through the fastening element but, as is customary in label punching, only up to the surface of the fastening element. One must take into account that if the check card is produced in this way the additional film makes the card body exceed the card thickness prescribed by the standard. However the mini chip card detached from the check card has the original card thickness. On the other hand, if the card structure is dimensioned so as to meet the standard together with the additional film, the subsequent mini chip card might be too thin or at the lower limit of the standard.

Figure 5:
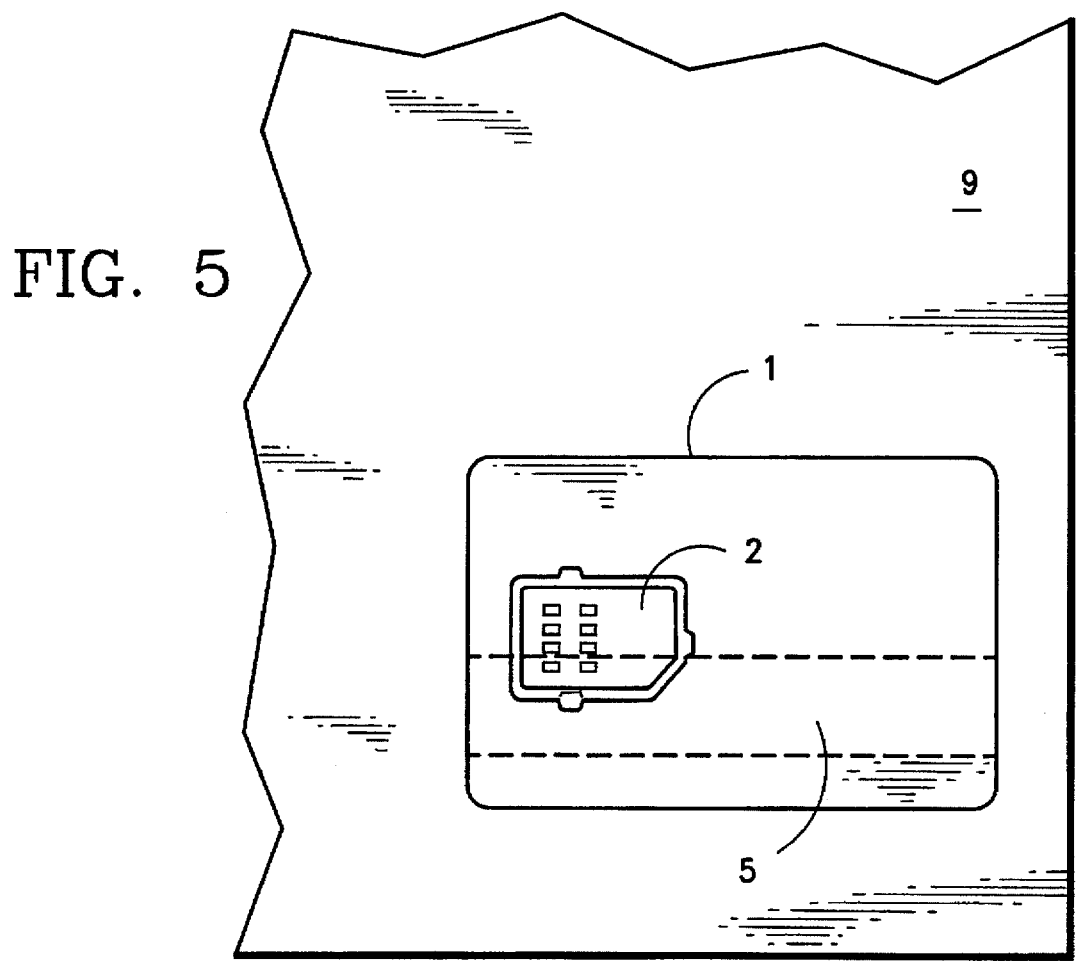
FIG. 5 shows the inventive check card/mini chip card configuration fixed to an additional data carrier.

A further embodiment of the invention is shown in FIG. 5. In this variant adhesive film 5 is adhesive on both sides. After a protective layer possibly provided on the back is removed such a card can be fastened to a carrier material 9 without any additional measures. Carrier 9 can be designed in the known way as an advertising vehicle, accompanying letter or the like.

The described embodiments involve a wide range of applications. The best embodiment for a given application should be selected with consideration of the particular advantages and disadvantages.

The expert will understand that a plurality of such mini chip cards can also be provided per check card body and fixed by the same principle, instead of the described single mini chip cards. Furthermore these mini chip cards can of course be disposed in the check card not only in the arrangement conforming to the standard but also outside the areas defined by the standard. Such measures are useful in particular if the check card is to be used only as a carrier element for a plurality of mini chip cards, for example to permit parallel processing of a plurality of mini chip cards per check card in usual commercial personalization devices.

It is equally obvious that the invention is also usable for contactless mini chip cards in which the particular contact surfaces are replaced by special technical measures or in which the energy and data transfer takes place by optical, capacitive or inductive coupling.

I claim:

1. A check card (1) having dimensions fixed by international standard ISO 7810 defined by check card edges and at least one mini-chip card (2) having mini-chip card edges disposed detachably within a window-like recess (7) extending completely through the check card so as to leave a gap defined by a punching line between the mini-chip card edges and the check card, said mini-chip card having a semiconductor chip and contact surfaces (4) located in a prearranged order relative to the mini-chip card edges and to the check card edges fixed by international standard ISO 7816/2, said mini-chip card being removably held in the recess by at least one fastening element (5) with respect to all requirements for contact surface positioning relative to the check card edges fixed by international standard ISO 7816/2, said fastening element being arranged on the surface of the check card and said mini-chip card (2) having precisely cut contour lines after removal from the check card, said mini-chip card edges serving to correctly position the contact surfaces of the mini-chip card during use; said fastening element (5) comprising an adhesive film that covers at least a part of the mini-chip card and the check card and spans at least a portion of said punching line.

2. A check card according to claim 1 wherein the adhesive film has self-adhesive properties on both sides thereof.

3. A check card (1) with fixed dimensions defined by check card edges and at least one mini-chip card (2) having mini-chip card edges disposed detachably in a window-like recess (7) in the check card, said mini-chip card having a semiconductor chip and contact surfaces (4) located in a prearranged order relative to the mini-chip card edges and to the check card edges, said mini-chip card being removably held in the recess by at least one fastening element (5) with respect to all requirements for contact surface positioning, said fastening element being arranged on the surface of the check card and said mini-chip card (2) having precisely cut contour lines after removal from the check card, said mini-chip card edges serving to correctly position the contact surfaces of the mini-chip card during use, said fastening element comprising an adhesive film with self-adhesive properties on both sides.

* * * * *